United States Patent
Winter et al.

(10) Patent No.: US 9,899,689 B2
(45) Date of Patent: Feb. 20, 2018

(54) ELECTRODE PLATE AND METHODS FOR MANUFACTURING AND TESTING AN ELECTRODE PLATE

(71) Applicant: RedFlow R&D Pty Ltd, Brisbane, Queensland (AU)

(72) Inventors: Alexander Rudolf Winter, Brisbane (AU); Thomas John, Brisbane (AU)

(73) Assignee: REDFLOW R&D PTY LTD, Queensland (AU)

( * ) Notice: Subject to any disclaimer, the term of this patent is extended or adjusted under 35 U.S.C. 154(b) by 130 days.

(21) Appl. No.: 15/029,275

(22) PCT Filed: Oct. 14, 2014

(86) PCT No.: PCT/AU2014/000964
§ 371 (c)(1),
(2) Date: Apr. 14, 2016

(87) PCT Pub. No.: WO2015/054721
PCT Pub. Date: Apr. 23, 2015

(65) Prior Publication Data
US 2016/0254553 A1    Sep. 1, 2016

(30) Foreign Application Priority Data

Oct. 15, 2013   (AU) ............................. 2013903965

(51) Int. Cl.
*H01M 8/00*    (2016.01)
*H01M 8/02*    (2016.01)
(Continued)

(52) U.S. Cl.
CPC .......... *H01M 8/0297* (2013.01); *G01M 3/20* (2013.01); *H01M 8/0273* (2013.01);
(Continued)

(58) Field of Classification Search
CPC ............ H01M 2/38; H01M 8/00; H01M 8/02; H01M 8/0273; H01M 8/0284;
(Continued)

(56) References Cited

U.S. PATENT DOCUMENTS

| 5,008,162 A | 4/1991 | Tomantschger et al. |
| 5,591,538 A | 1/1997 | Eidler et al. |
| 2006/0029121 A1* | 2/2006 | Boehmisch ............ G01N 25/72 374/45 |

FOREIGN PATENT DOCUMENTS

| GB | 752321 A | 7/1956 |
| JP | 2000-285909 A | 10/2000 |
| WO | 2008/116248 A1 | 10/2008 |

OTHER PUBLICATIONS

International Search Report and Written Opinion issued in connection with corresponding International application No. PCT/AU2014/000964, dated Nov. 17, 2014, 9 pages.

* cited by examiner

*Primary Examiner* — Nguyen Ha
(74) *Attorney, Agent, or Firm* — Duane Morris LLP

(57) ABSTRACT

An electrode plate, method for manufacturing an electrode plate, and method of testing an electrode plate enable efficient production of robust flowing electrolyte batteries. The method of testing an electrode plate includes forming a frangible portion in the electrode plate; providing a seal around a periphery of the electrode plate, wherein the periphery extends across the frangible portion; applying a gas adjacent a surface on a first side of the electrode plate; and detecting whether there is a presence of the gas adjacent a surface on a second side of the electrode plate, if the electrode plate passes testing, the frangible portion is removed from the electrode plate to define a cut-away region. The electrode plate is then positioned in a battery cell (Continued)

stack including a plurality of other electrode plates. A manifold is then attached to the cell stack adjacent the cut-away region of the electrode plate.

18 Claims, 7 Drawing Sheets

(51) Int. Cl.

| | |
|---|---|
| *H01M 8/04* | (2016.01) |
| *H01M 8/08* | (2016.01) |
| *H01M 10/04* | (2006.01) |
| *G01M 3/02* | (2006.01) |
| *H01M 8/0297* | (2016.01) |
| *H01M 10/42* | (2006.01) |
| *H01M 8/18* | (2006.01) |
| *H01M 8/20* | (2006.01) |
| *H01M 10/36* | (2010.01) |
| *H01M 8/0273* | (2016.01) |
| *H01M 8/0286* | (2016.01) |
| *H01M 8/04276* | (2016.01) |
| *H01M 8/2484* | (2016.01) |
| *G01M 3/20* | (2006.01) |
| *H01M 8/0284* | (2016.01) |
| *H01M 2/38* | (2006.01) |

(52) U.S. Cl.
CPC ....... *H01M 8/0284* (2013.01); *H01M 8/0286* (2013.01); *H01M 8/04283* (2013.01); *H01M 8/188* (2013.01); *H01M 8/20* (2013.01); *H01M 8/2484* (2016.02); *H01M 10/0486* (2013.01); *H01M 10/365* (2013.01); *H01M 10/4228* (2013.01); *H01M 10/4285* (2013.01); *H01M 2/38* (2013.01); *H01M 10/4214* (2013.01); *Y02E 60/528* (2013.01); *Y02P 70/56* (2015.11)

(58) Field of Classification Search
CPC .... H01M 8/0286; H01M 8/0287; H01M 8/04; H01M 8/04283; H01M 8/08; H01M 8/118; H01M 8/20; H01M 8/24; H01M 8/2484; H01M 10/00; H01M 10/04; H01M 10/0486; H01M 10/365; H01M 10/42; H01M 10/4214; H01M 10/4228; H01M 10/4285; G01M 3/00; G01M 3/02; G01M 3/20; Y02E 60/528; Y02P 70/56
See application file for complete search history.

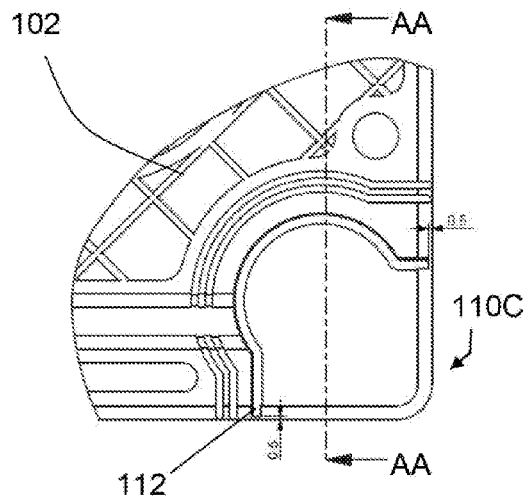
FIG. 3A
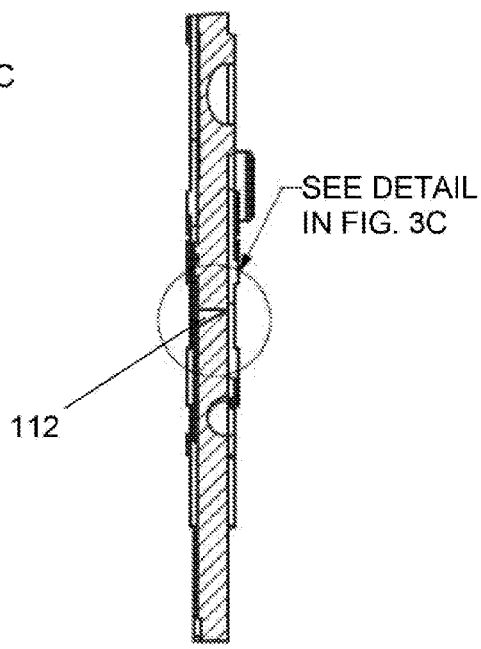
FIG. 3B
SECTION AA-AA OF FIG. 3A
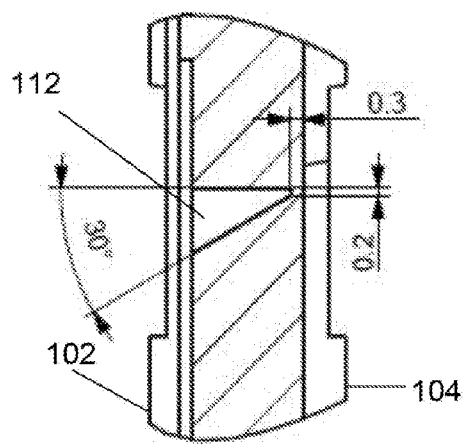
FIG. 3C. DETAIL FROM FIG. 3B

ELECTRODE PLATE AND METHODS FOR MANUFACTURING AND TESTING AN ELECTRODE PLATE

FIELD OF THE INVENTION

The present invention relates to electrode plates. In particular, although not exclusively, the invention relates to an electrode plate for a flowing electrolyte battery and methods for manufacturing and testing such a plate.

BACKGROUND TO THE INVENTION

Batteries used in stand alone power supply systems are commonly lead-acid batteries. However, lead-acid batteries have limitations in terms of performance and environmental safety. For example, typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

A flowing electrolyte battery, like a lead acid battery, comprises a stack of cells that produce a total voltage higher than that of individual cells. But unlike a lead acid battery, cells in a flowing electrolyte battery are hydraulically connected through an electrolyte circulation path.

The cell stack often comprises a stack of electrode plates separated by separator plates to define a plurality of half cells. The half cells each comprise an electrode plate, an adjacent separator plate and a capillary tube. The half cells are generally rectangular in top plan view, but have a cut-away region at corners of the electrode plate to accommodate a manifold for pumping electrolyte into and out of the battery. However, due to an often complex shape formed by the cut-away regions, testing of individual electrode plates before they are assembled into a battery can be difficult.

There is therefore a need to overcome or alleviate problems associated with manufacturing and testing electrode plates of flowing electrolyte batteries of the prior art.

The reference to any prior art in this specification is not, and should not be taken as, an acknowledgement or any form of suggestion that the prior art forms part of the common general knowledge either in Australia or elsewhere.

OBJECT OF THE INVENTION

It is an object, of some embodiments of the present invention, to provide consumers with improvements and advantages over the above described prior art, and/or overcome and alleviate one or more of the above described disadvantages of the prior art, and/or provide a useful commercial choice.

SUMMARY OF THE INVENTION

In one form, although not necessarily the only or broadest form, the present invention resides in an electrode plate for a flowing electrolyte battery, the electrode plate including one or more frangible portions.

Preferably, the one or more frangible portions are located adjacent one or more corners of the electrode plate.

Preferably, the electrode plate is planar and includes a top surface and a bottom surface.

Preferably, an edge of a periphery of the bottom surface is substantially flat for sealing against a seal of a test rig.

Preferably, an interface between at least one of the frangible portions and a remainder of the electrode plate includes a groove.

Preferably, the groove is formed in a top surface of the electrode plate.

Preferably, the frangible portions are defined in a polymer frame of the electrode plate.

Preferably, the polymer is High-Density Polyethylene (HDPE).

According to another aspect, the present invention includes a method of manufacturing an electrode plate for a flowing electrolyte battery, the method comprising: forming one or more frangible portions in the electrode plate; removing the one or more frangible portions from the electrode plate to define one or more cut-away regions; positioning the electrode plate in a battery cell stack; and attaching one or more manifolds to the battery cell stack adjacent the one or more cut-away regions.

Preferably, the one or more frangible portions are located adjacent one or more corners of the electrode plate.

Preferably, the method further comprises forming a substantially flat edge along a periphery of a bottom surface of the electrode plate and across the one or more frangible portions.

According to yet another aspect, the present invention includes a method of testing an electrode plate for a flowing electrolyte battery, the method comprising: forming one or more frangible portions in the electrode plate; providing a seal around a periphery of the electrode plate, wherein the periphery extends across the frangible portion;
  applying a gas adjacent a surface on a first side of the electrode plate; and detecting whether there is a presence of the gas adjacent a surface on a second side of the electrode plate.

Preferably, the gas is applied adjacent a top surface of the electrode plate and further comprising evacuating adjacent a bottom surface of the electrode plate.

Preferably, the gas is hydrogen.

Preferably, evacuating adjacent a bottom surface of the electrode plate is performed using a vacuum pump.

Preferably, the method further includes removing the one or more frangible portions from the electrode plate to define a cut-away region of the electrode plate; positioning the electrode plate in a battery cell stack including a plurality of other electrode plates; and attaching a manifold to the cell stack adjacent the cut-away region of the electrode plate.

Preferably, the one or more frangible portions are defined in a High-Density Polyethylene (HDPE) frame of the electrode plate.

Preferably, the one or more frangible portions are formed by defining a groove or a series of indentations in the electrode plate.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 3A is a diagram illustrating a detailed top view of the electrode plate of FIG. 1;

FIG. 3B is a diagram illustrating a cross sectional view AA-AA of the electrode plate of FIG. 3A;

FIG. 3C is a diagram illustrating a detailed view of the cross section AA-AA of FIG. 3B;

DETAILED DESCRIPTION OF THE INVENTION

Figure 1:
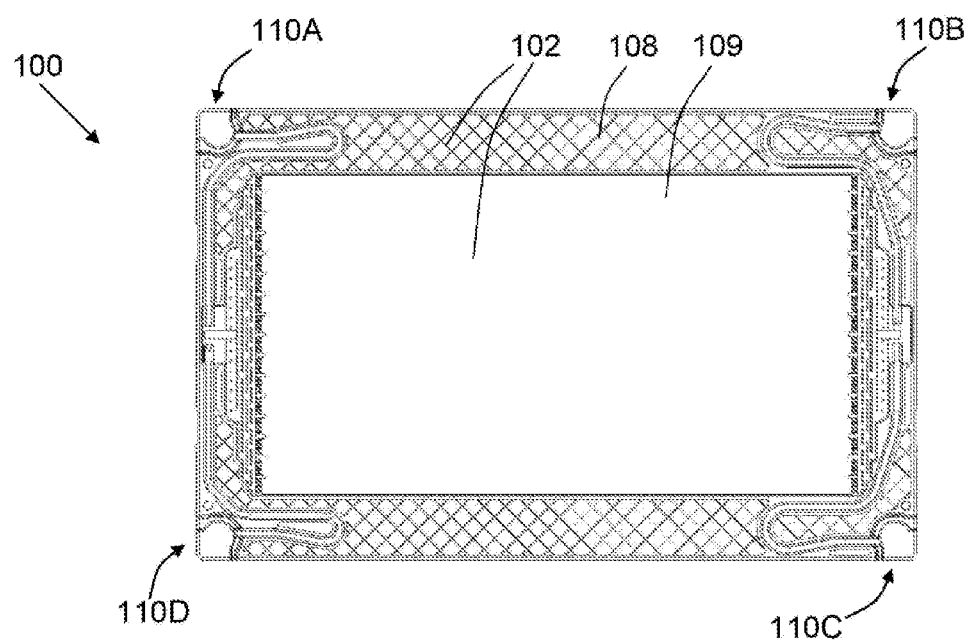
FIG. 1 is a diagram illustrating a top view of an electrode plate for a flowing electrolyte battery according to an embodiment of the present invention.

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 2:
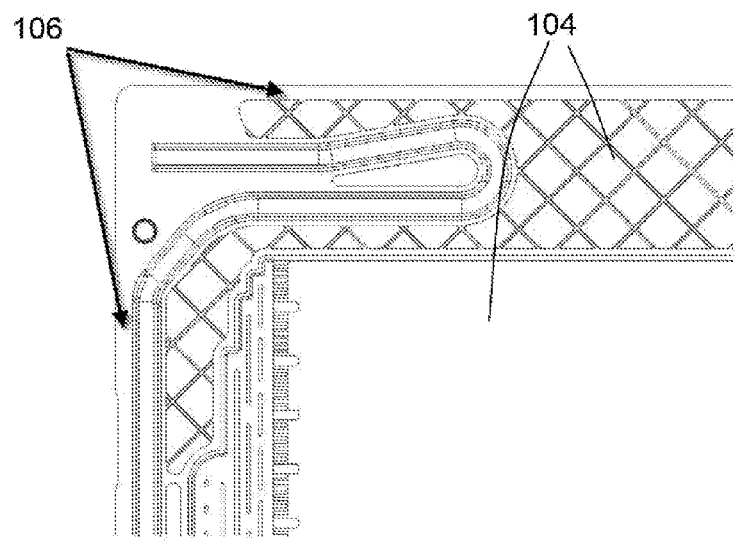
FIG. 2 is a diagram illustrating a partial bottom view of the electrode plate of FIG. 1.

FIG. 1 is a diagram illustrating a top view of an electrode plate 100 for a flowing electrolyte battery, and FIG. 2 is a diagram illustrating a partial bottom view of the electrode plate 100 of FIG. 1, according to an embodiment of the present invention.

Referring to FIGS. 1 and 2 the electrode plate 100 is planar and includes a frame 108 for housing an electrode 109. The electrode plate 100 includes a top surface 102 and a bottom surface 104. An edge 106 of a periphery of the bottom surface 104, and in particular the frame 108, is substantially flat to facilitate a good seal between the electrode plate 100 and a test jig for testing the electrode plate 100 for defects. Although the electrode plate 100 is depicted as being rectangular, it should be appreciated that other embodiments of electrode plates of the present invention may be any suitable shape.

In one embodiment, the frame 108 is made of a plastic material such as High-Density Polyethylene (HOPE). However it should be appreciated that the frame 108 may be made of any material that is compatible with the flowing electrolyte and the electrode.

The electrode plate 100, and in particular the frame 108, also includes frangible portions 110A, 110B, 110C, 110C formed adjacent each corner of the electrode plate 100. Although four frangible portions 110A, 110B, 110C, 110D are shown, it should be appreciated that other embodiments of electrode plates of the present invention may include one or more frangible portions. In addition, according to some embodiments, the frangible portions may be formed anywhere in the electrode plate, either along an edge of the electrode plate or at an internal section of the electrode plate.

The frangible portions 110A, 110B, 110C, 110D are designed to be broken off, once the electrode plate 100 has been tested, to accommodate a manifold of a flowing electrolyte battery. An advantage of this arrangement is that it makes pre-assembly testing of the electrode plate 100 easier and more robust, as the electrode plate 100 including the frangible portions 110A, 110B, 110C, 110D defines a more regular shape including a smooth surface around its periphery to enable sealing against a test jig.

FIG. 3A is a diagram illustrating a detailed top view of one corner of the electrode plate 100 of FIG. 1, showing a single frangible portion 110C in more detail. FIG. 3B is a diagram illustrating a cross sectional view AA-AA of the corner of the electrode plate 100 of FIG. 3A. FIG. 3C is a diagram illustrating a detailed view of the cross section AA-AA of FIG. 3B. The other frangible portions 110A, 110B, 110D are similar to the frangible portion 110C.

Referring to FIGS. 3A, 3B and 3C, an interface between the frangible portion 110C and a remainder of the electrode plate 100, includes a groove 112. In one embodiment the groove 112 is a wedge shape defining an angle of approximately 30 degrees to an axis normal to the plane of the electrode plate 100. As shown, the groove 112 terminates 0.5 mm from an edge of the electrode plate 100. However it should be appreciated that the groove 112 may be any suitable shape so that the frangible portion 110C may be easily snapped off after testing of the electrode plate 100. In addition, although the groove 112 is shown as being continuous, it should be appreciated that the groove 112 alternatively may be replaced with, for example, a series of small indentations. Various techniques for manufacturing frangible portions in materials such as polymers are well known in the art and can be applied to the present invention.

An interface between the frangible portions 110A, 110B, 110C, 110D and a remainder of the electrode plate 100 is made generally smooth in order to connect to the manifold of the battery. In addition, the groove 112 does not extend into the bottom surface 104. Rather, the groove 112 stops approximately 0.3 mm from the bottom surface 104. That enables the bottom surface 104 to maintain a seal with a test jig during testing of the electrode plate 100 and before the frangible portions 110A, 110B, 110C, 110D are broken off.

Figure 4:
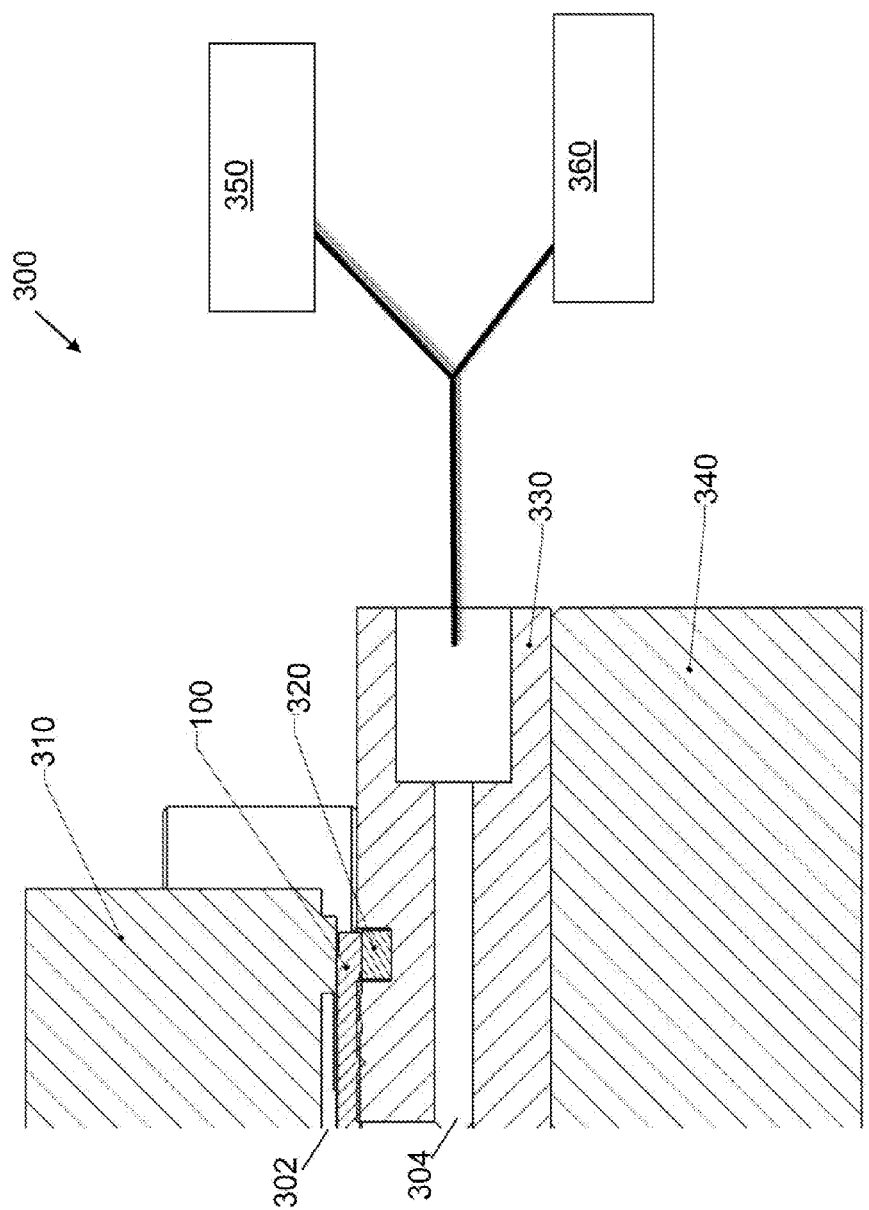
FIG. 4 is a diagram illustrating a test jig for testing the electrode plate of FIG. 1 according to an embodiment of the present invention.

The electrode plate 100 is tested by placing it in a test jig. FIG. 4 is a diagram illustrating a test jig 300 for testing the electrode plate 100, according to an embodiment of the present invention. The test jig 300 includes a pressure plate 310, a seal such as an o-ring 320, a vacuum plate 330, a press plate 340, a vacuum pump 350 and a gas detector 360. The electrode plate 100 under test is positioned in the test jig 300 between the pressure plate 310 and the vacuum plate 330. The pressure plate 310 applies pressure to the top surface 102 of the electrode plate 100 such that the edge 106 of the bottom surface 104 seals against the o-ring 320, which extends around the periphery of the electrode plate 100.

During a test, a gas, such as hydrogen, is pumped into a top cavity 302 formed between the pressure plate 310 and the electrode plate 100, the top cavity 302 being adjacent the top surface 102 of the electrode plate 100. A bottom cavity 304, adjacent the bottom surface 104 of the electrode plate 100, is then evacuated by the vacuum pump 350 which is also connected to the bottom cavity 304. If the electrode plate 100 is defective, for example if the electrode plate 100 has a crack or a hole, the gas flows from the top cavity 302 to the bottom cavity 304 and is detected by the gas detector 360. Upon detection of the gas, the gas detector 360 may sound an alarm in order to signal to an operator that the electrode plate 100 is defective and should be discarded. Alternatively, the defective electrode plate 100 may be discarded automatically by the test jig 300. Alternatively, during a test, the bottom cavity 304, adjacent the bottom surface 104 of the electrode plate 100, is evacuated by the vacuum pump 350 which is also connected to the bottom cavity 304 and when the resulting vacuum reaches a set value, the pumping stops. If the electrode plate 100 is defective, for example if the electrode plate 100 has a crack or a hole, the set value of the vacuum drops and the electrode plate is identified as a faulty one. Upon detection of the pressure drop, a pressure switch can trigger an alarm in order to signal to an operator that the electrode plate 100 is defective and should be discarded. Or the defective electrode plate 100 may be discarded automatically by the test jig 300. As yet another alternative, as will be understood by those having ordinary skill in the art, a positive pressure can be used instead of a vacuum, where the positive pressure is applied in the top cavity 302 formed between the pressure plate 310 and the electrode plate 100.

Figure 5:
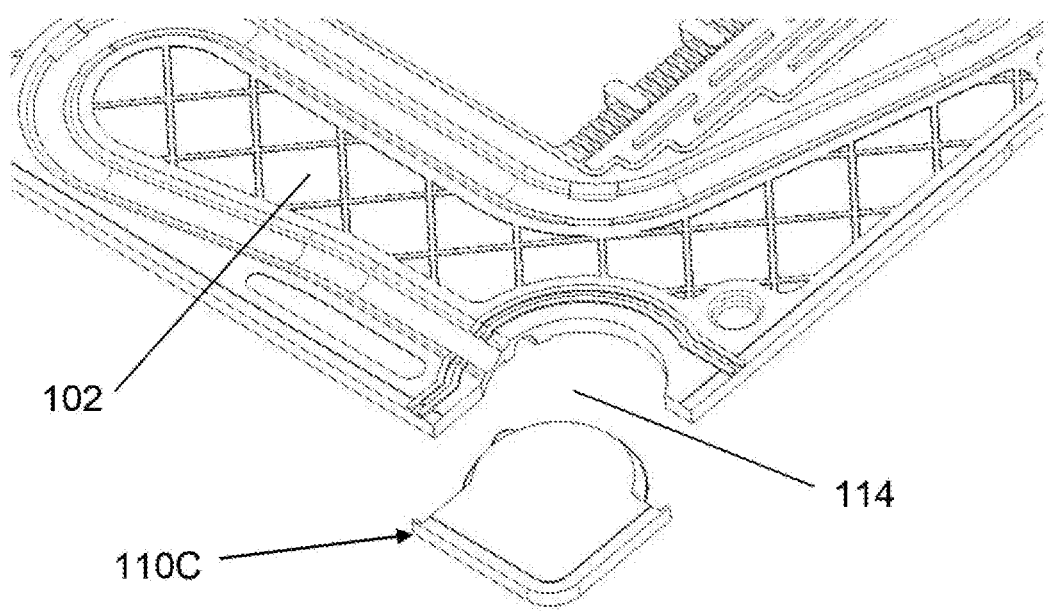
FIG. 5 is a diagram illustrating a detailed top perspective view of the electrode plate of FIG. 1 with a frangible portion removed.

After the electrode plate 100 has been tested, each of the frangible portions 110A, 110B, 110C, 110D is removed by placing pressure on the top surface 104 of the electrode plate 100. FIG. 5 is a diagram illustrating a detailed top perspective view of the electrode plate 100 of FIG. 1 with the frangible portion 110C removed. As shown in FIG. 5, when the frangible portion 110C is removed, the electrode plate 100 defines a cut-away space 114 complementing a shape of the frangible portion 110C.

Figure 6:
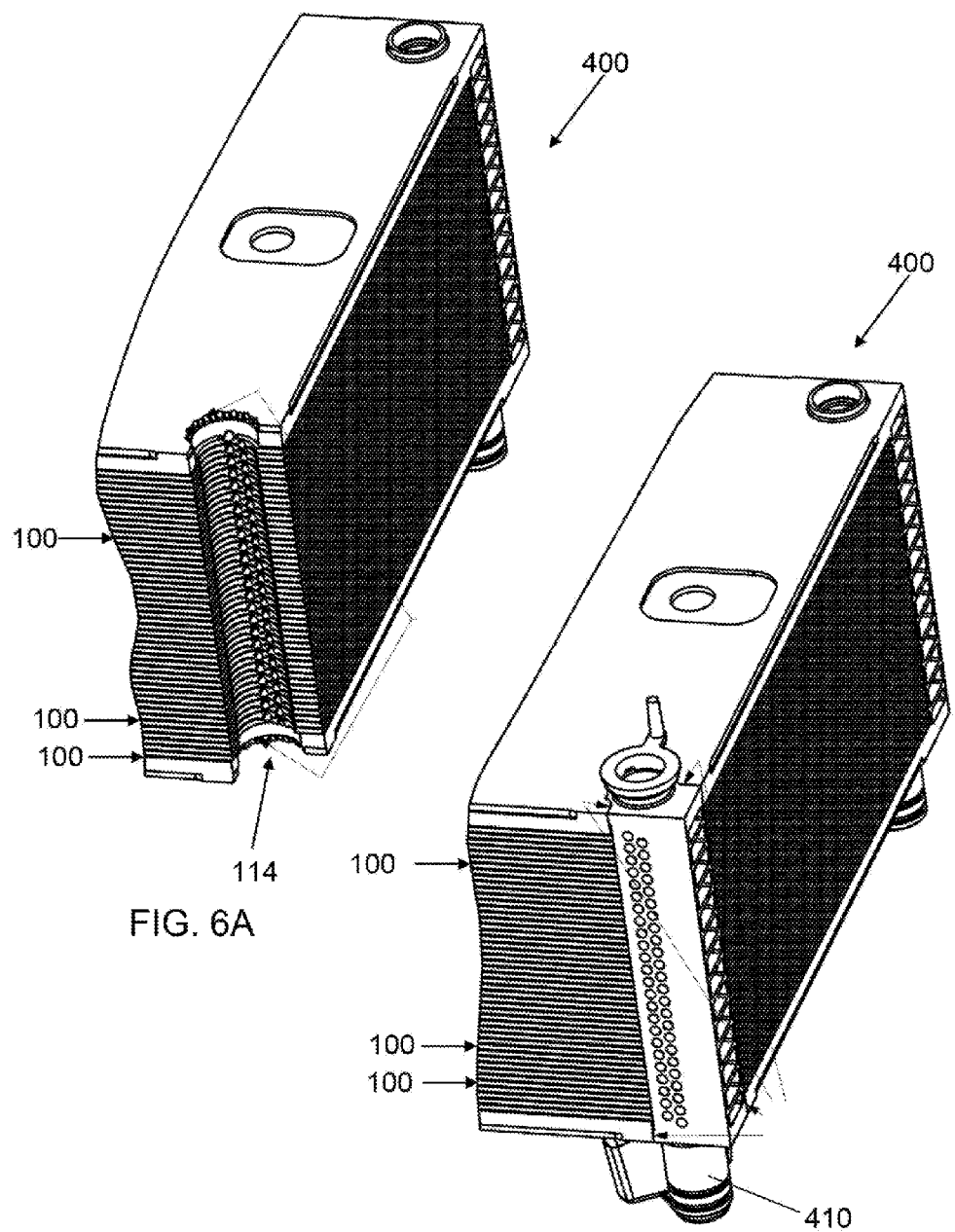
FIG. 6A is a diagram illustrating a partial perspective view of an assembled cell stack of a flowing electrolyte battery without a manifold, according to an embodiment of the present invention.
FIG. 6B is a diagram illustrating a partial perspective view of an assembled cell stack of a flowing electrolyte battery with a manifold installed, according to an embodiment of the present invention.

In use, once the frangible portion 110 has been removed from the electrode plate 100, a plurality of electrodes 100 are assembled together to form a flowing electrolyte battery. FIG. 6A is a diagram illustrating a partial perspective view of an assembled cell stack of a flowing electrolyte battery 400, without a manifold, according to an embodiment of the present invention. FIG. 6B is a diagram illustrating a partial perspective view of the assembled cell stack of the flowing electrolyte battery 400 with a manifold 410, according to an embodiment of the present invention. As shown in FIGS. 6A and 6B, the cut-away space 114 of each electrode plate 100 complements and receives the shape of the manifold 410 of the battery 400. During use, electrolyte then flows to (or from) the manifold 410 and from (or to, respectively) the battery half cell cavities defined between adjacent electrode plates 100.

Figure 7:
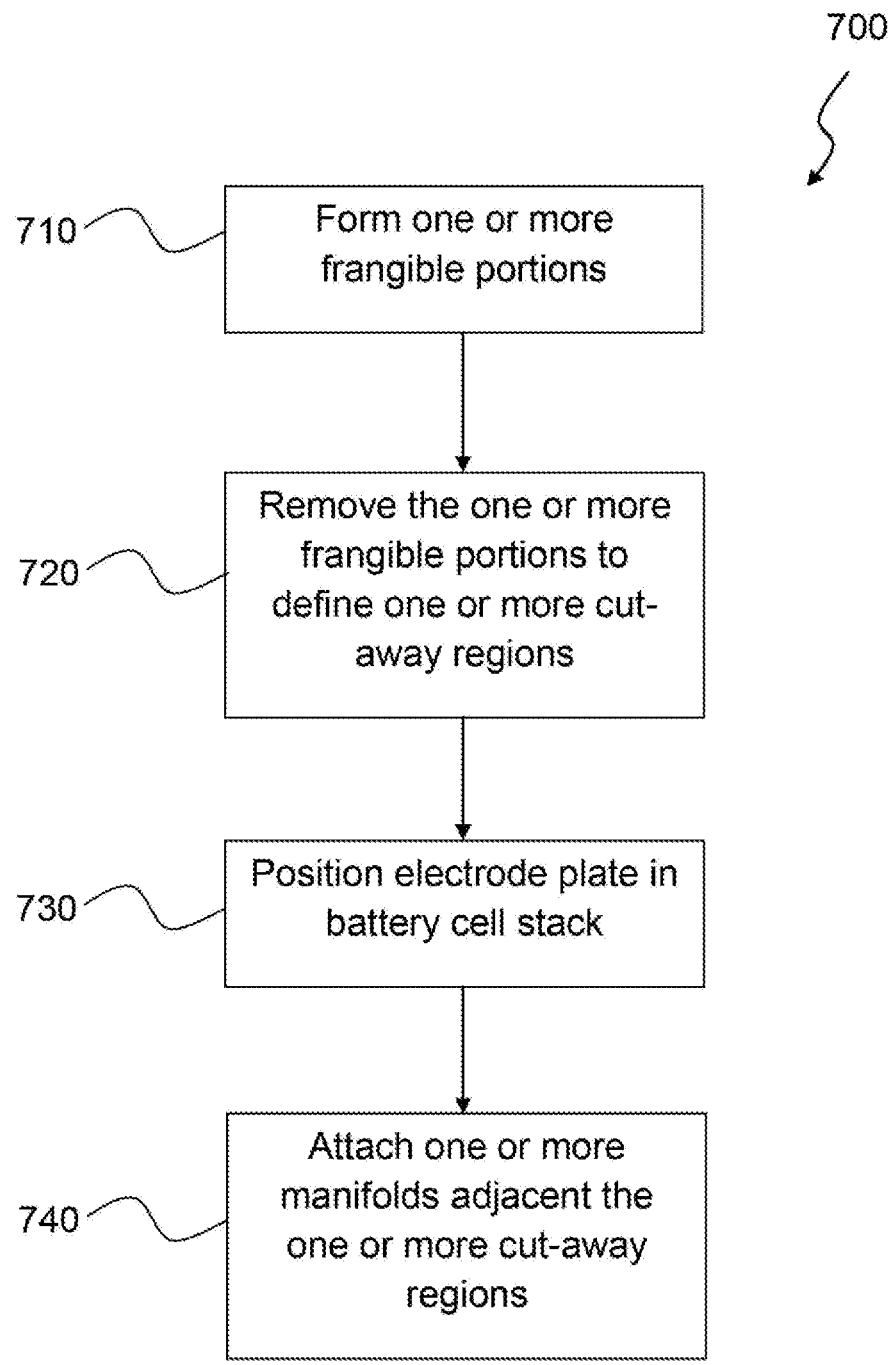
FIG. 7 is a process flow diagram illustrating a method of manufacturing an electrode plate of a flowing electrolyte battery, according to an embodiment of the present invention.

FIG. 7 is a flow diagram illustrating a method 700 for manufacturing an electrode plate according to an embodiment of the present invention. At step 710, one or more frangible portions are formed in the electrode plate.

At step 720, the one or more frangible portions are removed from the electrode plate to define one or more cut-away regions.

At step 730, the electrode plate is positioned in a battery cell stack.

At step 740, one or more manifolds are attached to the battery cell stack adjacent the one or more cut-away regions.

Figure 8:
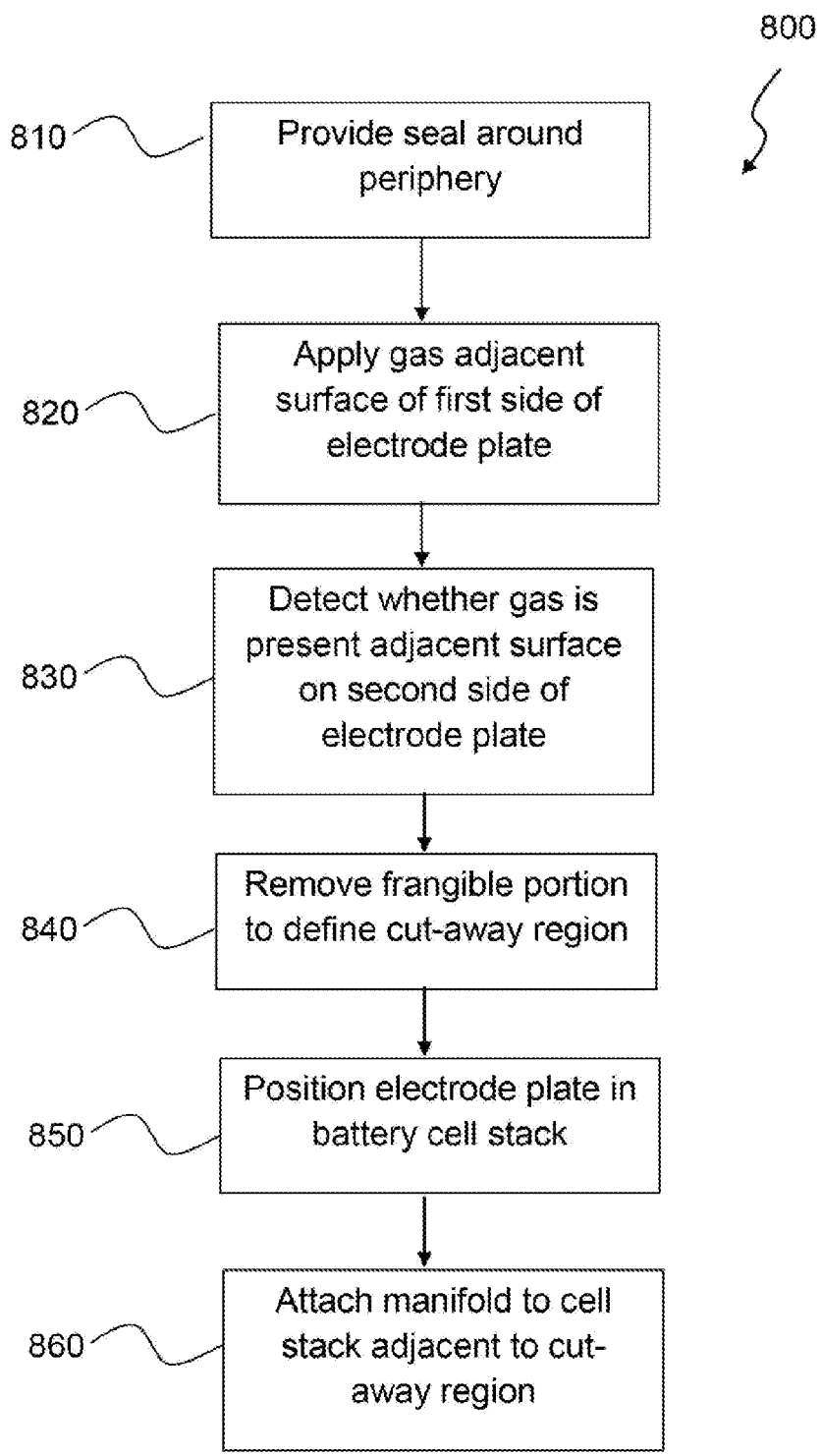
FIG. 8 is a process flow diagram illustrating a method of testing an electrode plate of a flowing electrolyte battery, according to an embodiment of the present invention.

FIG. 8 is a flow diagram illustrating a method 800 for testing an electrode plate of a flowing electrolyte battery according to an embodiment of the present invention. At step 810, a seal is provided around a periphery of the electrode plate, wherein the periphery includes a frangible portion against which the seal is provided.

At step 820, a gas is applied adjacent a surface on a first side of the electrode plate.

At step 830, detecting whether there is a presence of the gas adjacent a surface on a second side of the electrode plate is performed. If a presence of the gas is detected, then for example it is assumed that the electrode plate is defective and the electrode plate is discarded.

Assuming that a presence of the gas is not detected on the second side, or that only an acceptably low concentration of the gas is detected, then at step 840 the frangible portion is removed from the electrode plate, thus defining a cut-away region of the electrode plate.

At step 850, the electrode plate is positioned in a battery cell stack.

Finally, at step 860, a manifold is attached to the cell stack adjacent the cut-away region of the electrode plate.

In summary, advantages of some embodiments of the present invention comprise an electrode plate including a smooth, substantially flat, periphery surface integrated with a frangible portion to facilitate efficient and robust manufacture and testing of the electrode plate. After successful testing, the frangible portion is removed so that a plurality of electrode plates can interface with a manifold of a battery.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. An electrode plate for a flowing electrolyte battery, wherein the electrode plate includes one or more frangible portions.

2. The electrode plate of claim 1, wherein the one or more frangible portions are located adjacent one or more corners of the electrode plate.

3. The electrode plate of claim 1, wherein the electrode plate is planar and includes a top surface and a bottom surface.

4. The electrode plate of claim 1, wherein an edge of a periphery of the bottom surface is substantially flat for sealing against a seal of a test rig.

5. The electrode plate of claim 1, wherein an interface between at least one of the frangible portions and a remainder of the electrode plate includes a groove.

6. The electrode plate of claim 5, wherein the groove is formed in a top surface of the electrode plate.

7. The electrode plate of claim 1, wherein the frangible portions are defined in a polymer frame of the electrode plate.

8. The electrode plate of claim 7, wherein the polymer is High-Density Polyethylene (HDPE).

9. A method of manufacturing an electrode plate for a flowing electrolyte battery, the method comprising:
   forming one or more frangible portions in the electrode plate;
   removing the one or more frangible portions from the electrode plate to define one or more cut-away regions;
   positioning the electrode plate in a battery cell stack; and
   attaching one or more manifolds to the battery cell stack adjacent the one or more cut-away regions.

10. The method of claim 9, wherein the one or more frangible portions are located adjacent one or more corners of the electrode plate.

11. The method of claim 9, further comprising forming a substantially flat edge along a periphery of a bottom surface of the electrode plate and across the one or more frangible portions.

12. A method of testing an electrode plate for a flowing electrolyte battery, the method comprising:
    forming one or more frangible portions in the electrode plate;
    providing a seal around a periphery of the electrode plate, wherein the periphery extends across the one or more frangible portions;
    applying a gas adjacent a surface on a first side of the electrode plate; and
    detecting whether there is a presence of the gas adjacent a surface on a second side of the electrode plate.

13. The method of claim 12, wherein the gas is applied adjacent a top surface of the electrode plate and further comprising evacuating adjacent a bottom surface of the electrode plate.

14. The method of claim 12, wherein the gas is hydrogen.

15. The method of claim 13, wherein evacuating adjacent a bottom surface of the electrode plate is performed using a vacuum pump.

16. The method of claim 12, further comprising:
    removing the one or more frangible portions from the electrode plate to define a cut-away region of the electrode plate;
    positioning the electrode plate in a battery cell stack including a plurality of other electrode plates; and
    attaching a manifold to the cell stack adjacent the cut-away region of the electrode plate.

17. The method of claim 12, wherein the one or more frangible portions are defined in a High-Density Polyethylene (HDPE) frame of the electrode plate.

18. The method of claim 12, wherein the one or more frangible portions are formed by defining a groove or a series of indentations in the electrode plate.

* * * * *